US012582090B1

(12) United States Patent
Acosta

(10) Patent No.: US 12,582,090 B1
(45) Date of Patent: Mar. 24, 2026

(54) INTERACTIVE PET TREAT DISPENSER

(71) Applicant: Ulises Acosta, Katy, TX (US)

(72) Inventor: Ulises Acosta, Katy, TX (US)

( * ) Notice: Subject to any disclaimer, the term of this patent is extended or adjusted under 35 U.S.C. 154(b) by 0 days.

(21) Appl. No.: 18/772,846

(22) Filed: Jul. 15, 2024

(51) Int. Cl.
*A01K 5/01* (2006.01)

(52) U.S. Cl.
CPC .................................. *A01K 5/0114* (2013.01)

(58) Field of Classification Search
CPC .... A01K 5/0114; A01K 5/0121; A01K 15/02; A01K 15/025; A01K 15/026; A01K 15/2027; A63F 9/0601; A63B 69/0079
See application file for complete search history.

(56) References Cited

U.S. PATENT DOCUMENTS

| | | | |
|---|---|---|---|
| D270,850 S | 10/1983 | Ortega | |
| 6,412,736 B1 | 7/2002 | Zaragoza | |
| 6,669,152 B2 * | 12/2003 | Hernandez | A63B 71/023 248/165 |

| | | | |
|---|---|---|---|
| 9,198,399 B1 * | 12/2015 | Grooms | A01K 15/025 |
| 9,345,941 B1 | 5/2016 | Celedon | |
| 9,642,339 B2 | 5/2017 | Bush | |
| 9,782,685 B1 * | 10/2017 | Perez | A63H 1/32 |
| 10,071,889 B1 | 9/2018 | Lopez | |
| 10,449,467 B1 * | 10/2019 | Vaca | A63H 37/00 |
| 12,239,103 B2 * | 3/2025 | Harlow | A01K 15/025 |
| 2007/0099534 A1 | 5/2007 | Alas | |
| 2018/0242554 A1 * | 8/2018 | Vance | A01K 15/025 |

FOREIGN PATENT DOCUMENTS

| | | |
|---|---|---|
| WO | WO9635619 | 11/1996 |

* cited by examiner

*Primary Examiner* — Ebony E Evans

(57) ABSTRACT

An interactive pet treat dispenser includes a support frame, a container, a suspension assembly, and a plurality of cover structures. The support frame includes a pair of support legs. The container is designed to store pet treats therein and includes a plurality of orifices through which pet treats may exit the container. The suspension assembly detachably connects the container to the support legs in a suspended manner between the support legs to permit a pet to physically engage and manipulate the container to cause pet treats to exit the container through the orifices. The cover structures are designed to be selectively removably connected to the container to partially or fully close the orifices to restrict or prevent pet treats from exiting the container.

12 Claims, 7 Drawing Sheets

INTERACTIVE PET TREAT DISPENSER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet treat dispensers and more particularly pertains to a new interactive pet treat dispenser to provide a fun accessory for pet birthdays and a toy for physical and mental stimulation of pets.

(2) Description of Related Art Including Information Disclosed Under 37 CFR 1.97 and 1.98

The prior art relates to pet treat dispensers. The prior art, as best understood, does not disclose an interactive pet treat dispenser includes a support frame, a container, a suspension assembly, and a plurality of cover structures, wherein the container is suspended between a pair of support legs to permit a pet to physically engage and manipulate the container to cause pet treats to exit the container through the orifices, and wherein the cover structures are designed to be selectively removably connected to the container to partially or fully close the orifices to restrict or prevent pet treats from exiting the container.

BRIEF SUMMARY OF THE INVENTION

An embodiment of the disclosure meets the needs presented above in an interactive pet treat dispenser generally comprising a support frame, a container, a suspension assembly, and a plurality of cover structures. The support frame includes a pair of support legs. The container is designed to store pet treats therein and includes a plurality of orifices through which pet treats may exit the container. The suspension assembly detachably connects the container to the support legs in a suspended manner between the support legs to permit a pet to physically engage and manipulate the container to cause pet treats to exit the container through the orifices. The cover structures are designed to be selectively removably connected to the container to partially or fully close the orifices to restrict or prevent pet treats from exiting the container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
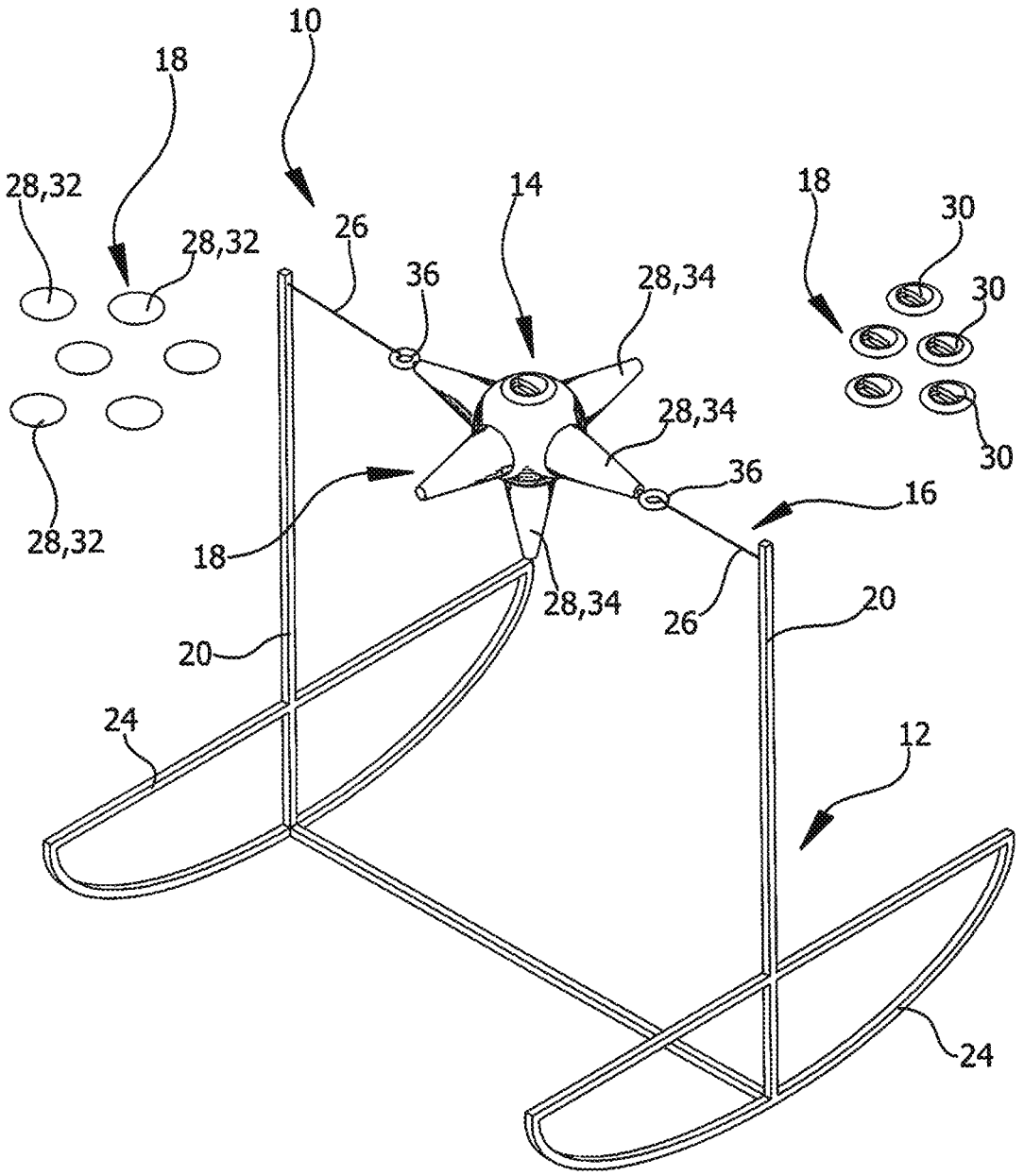
FIG. 1 is a perspective view of an interactive pet treat dispenser according to an embodiment of the disclosure.

With reference now to the drawings, and in particular to FIGS. 1 through 8 thereof, a new interactive pet treat dispenser embodying the principles and concepts of an embodiment of the disclosure and generally designated by the reference numeral 10 will be described.

Figure 2:
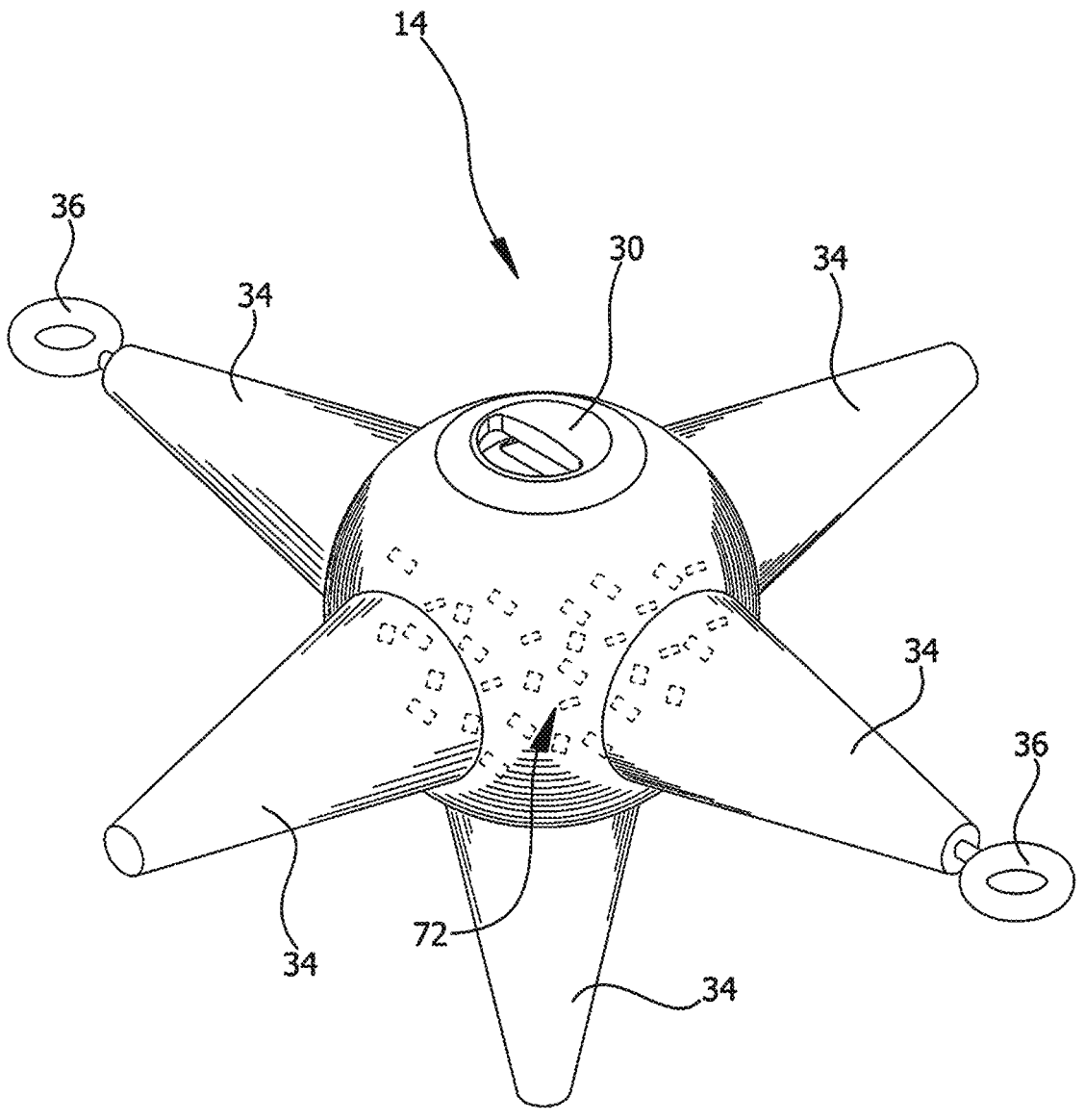
FIG. 2 is a perspective view of a portion of an embodiment of the disclosure.
Figure 3:
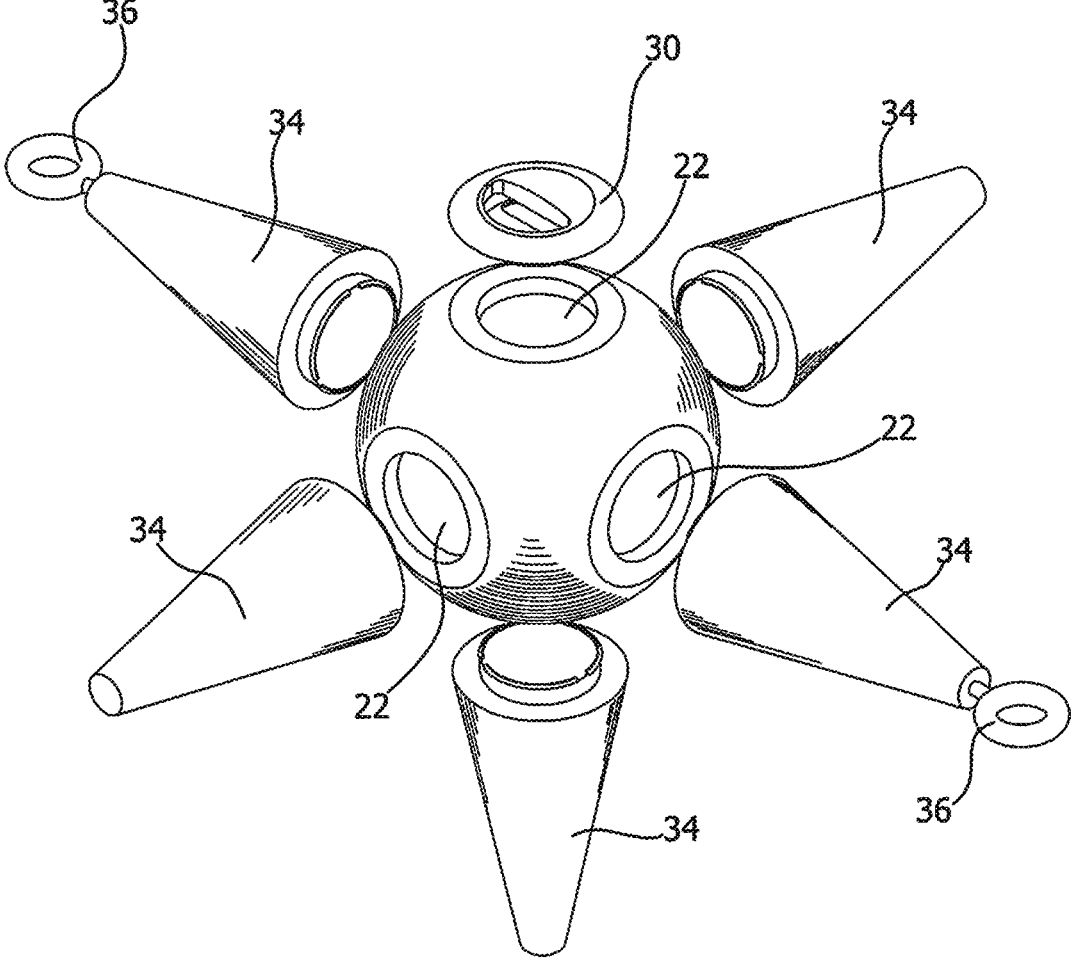
FIG. 3 is an exploded view of a portion of an embodiment of the disclosure.
Figure 7:
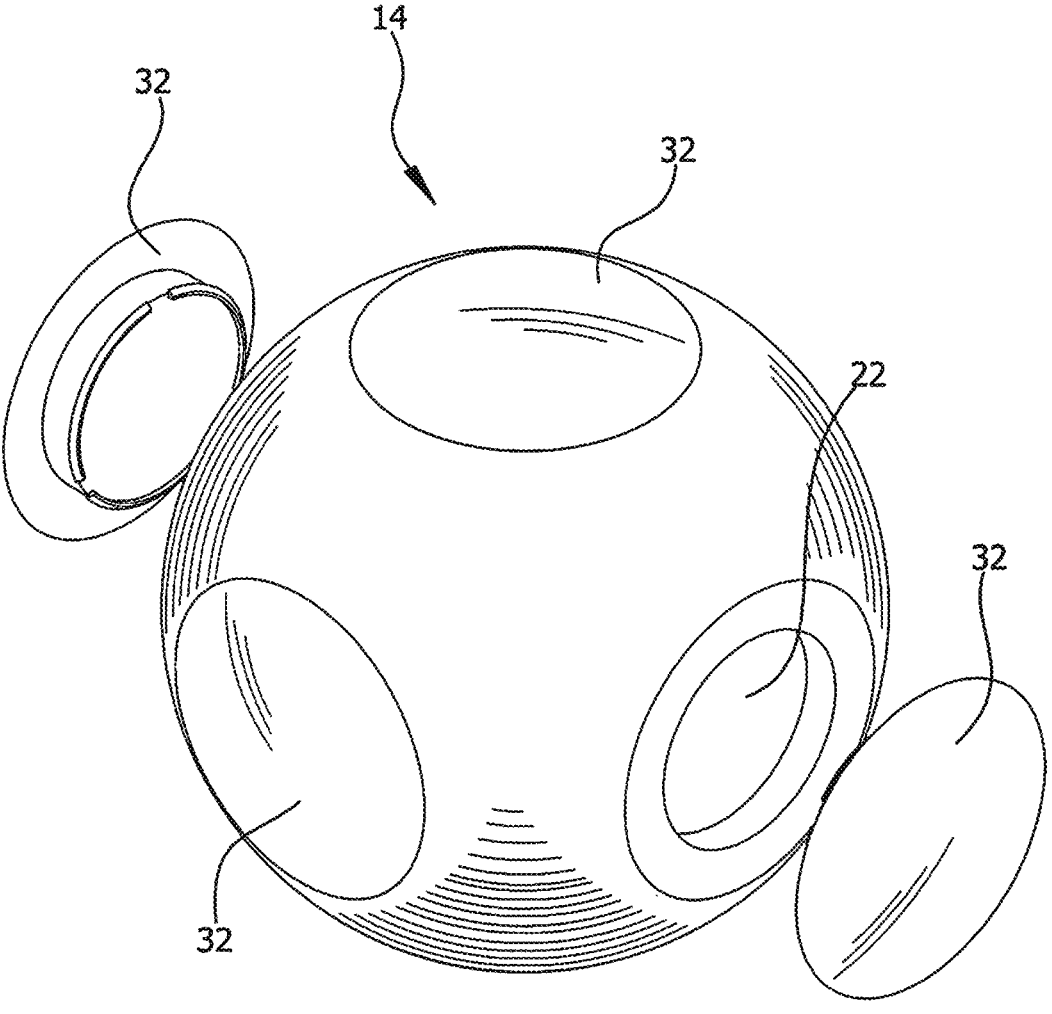
FIG. 7 is an exploded view of a portion of an embodiment of the disclosure.
Figure 8:
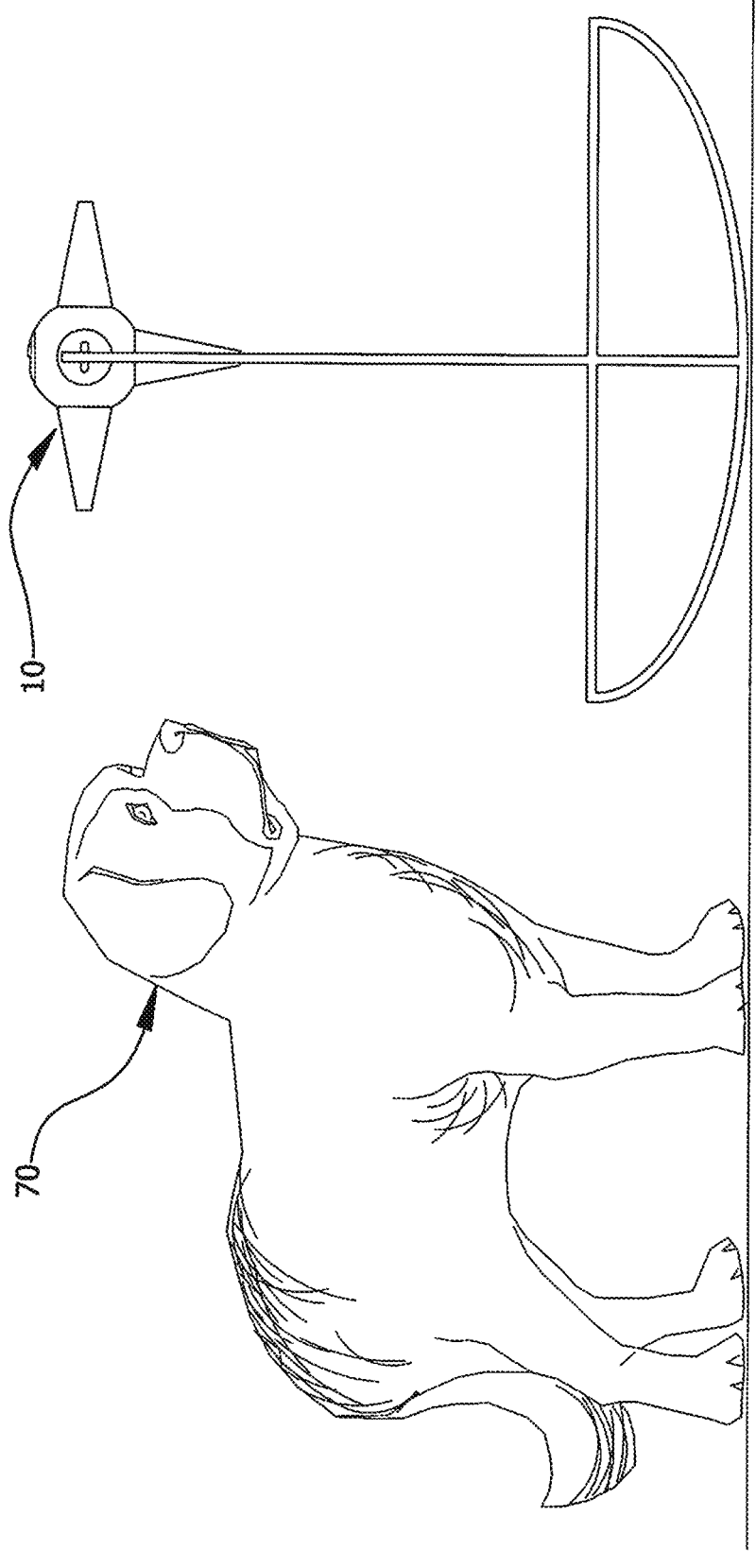
FIG. 8 is a side view of an embodiment of the disclosure in use.

As best illustrated in FIGS. 1 through 8, the interactive pet treat dispenser 10 generally comprises a support frame 12, a container 14, a suspension assembly 16, and a plurality of cover structures 18. The support frame 12 includes a pair of support legs 20. As shown in FIG. 2, the container 14 is designed to store pet treats 72 therein and includes a plurality of orifices 22 (see FIG. 3) through which pet treats 72 may exit the container 14. The suspension assembly 16 detachably connects the container 14 to the support legs 20 in a suspended manner between the support legs 20 to permit a pet 70 to physically engage and manipulate the container 14 to cause pet treats 72 to exit the container 14 through the orifices 22. As shown in FIGS. 3 and 7, the cover structures 18 are designed to be selectively removably connected to the container 14 to partially or fully close the orifices 22 to restrict or prevent pet treats 72 from exiting the container 14.

In the exemplary embodiment shown in FIG. 1, the support frame 12 includes a pair of rounded base structures 24, each attached to a corresponding one of the pair of support legs 20 and designed to permit temporary tilting of the support frame 12 by the pet 70. The base structures 24 are much like the bottom of a rocking chair to let the pet 70 tilt the entire frame and the container 14 connected thereto.

The container 14 is sphere-shaped, though other shapes, such as squares or pyramids, are within the scope of the disclosure. In the exemplary embodiment shown, there are six orifices 22 oriented facing in six different directions on six different sides of the container 14, though in other embodiments there could be more or fewer orifices 22 facing in more or fewer directions. That being said, more orifices 22 in more directions provide the pet owner with more options for controlling the dispensing of treats and the interaction and manipulation required of the pet 70 to cause dispensing of treats.

The suspension assembly 16 includes a pair of resiliently stretchable and twistable wires 26 connecting opposite sides of the container 14 to the pair of support legs 20. The wires 26 could be a rubber or similar material that is both elastic and resilient so that the pet 70 can pull and turn the container 14, but the container 14 will return to its original position.

The cover structures 18 can be a combination of different covers of different types. In the exemplary embodiment in FIG. 1, the cover structures 18 are divided into solid caps 28 that completely close the orifices 22 and ported caps 30 that partially close the orifices 22. Regarding the solid caps 28, they can be made in two different designs, wherein one type 32 of solid caps 28, as shown in FIG. 7, has an outer surface that is flush with and follows the outer surface of the container 14 when inserted. In the example shown in FIG. 7, the outer surface of the flush solid cap 32 is rounded or dome-shaped to follow the spherical design of the container 14. The other type 34 of solid caps 28 includes a projecting structure 34 that projects out from the outer surface of the container 14 when inserted to provide the pet 70 with a structure to physically engage and manipulate. In the exemplary embodiment shown in FIGS. 1, 2, and 3, the projecting structure 34 is in the shape of a cone, though other shapes are within the scope of the disclosure. In the exemplary embodiment, the wires 26 are connected by eye hooks 36 to two of the projecting structures 34, though this is only one possibility as the wires 26 could be connected directly to the container 14 itself.

Figure 4:
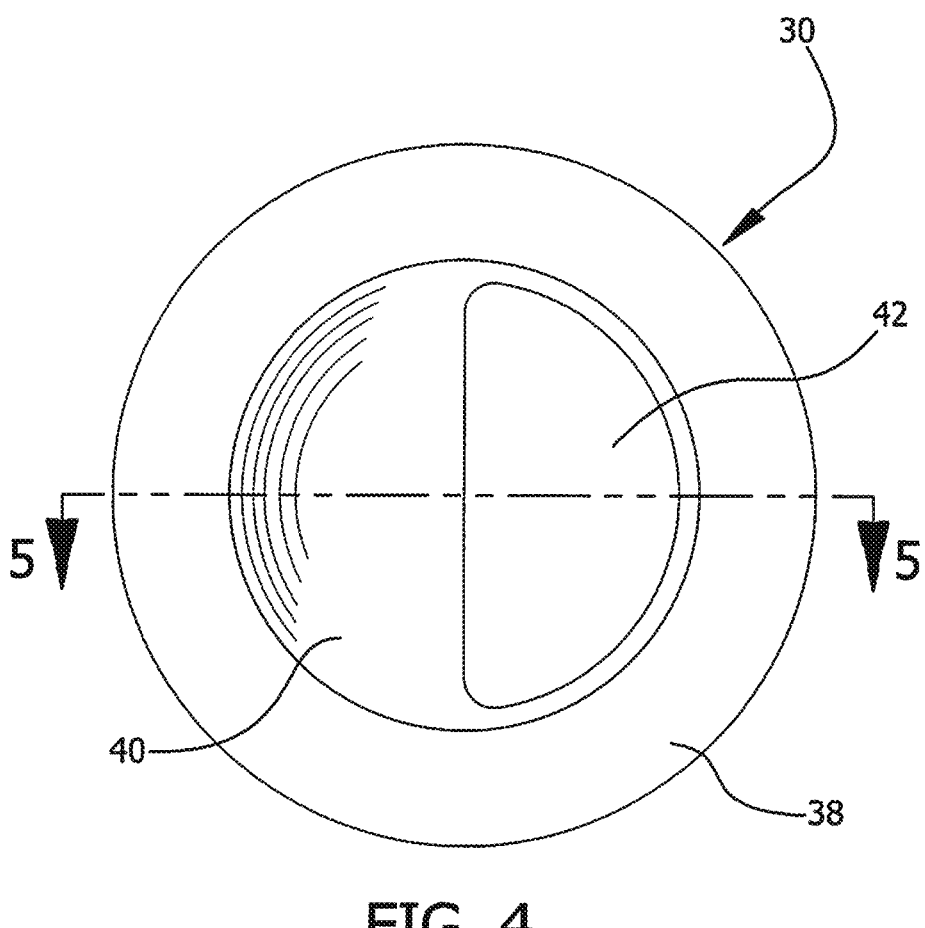
FIG. 4 is a top view of a portion of an embodiment of the disclosure.
Figure 5:
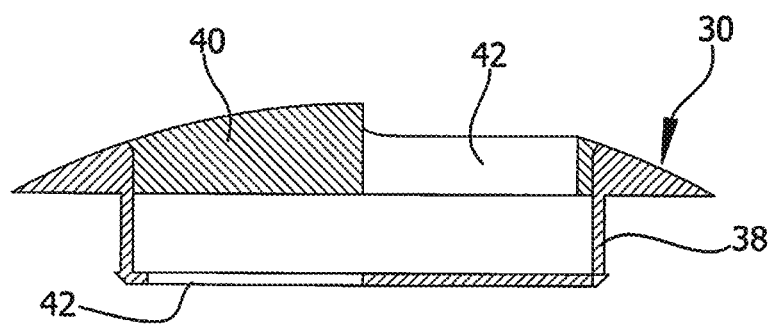
FIG. 5 is a cross-section view of a portion of an embodiment of the disclosure.
Figure 6:
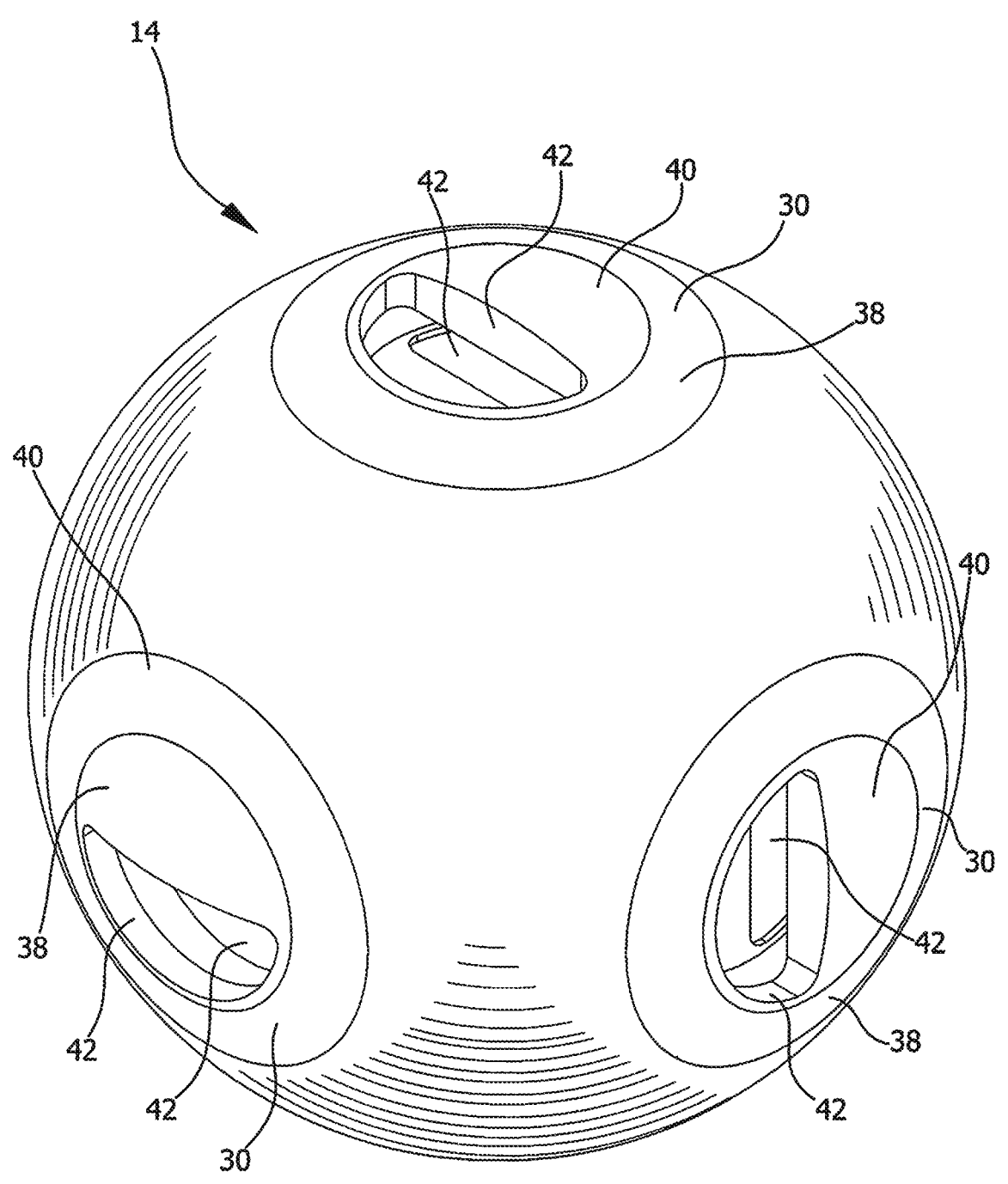
FIG. 6 is a perspective view of a portion of an embodiment of the disclosure.

Aside from the solid caps 28, there is a set of ported caps 30. As best seen in FIGS. 4 and 5, the ported caps 30 comprise a base portion 38 insertable into the orifices 22 and a cap portion 40 rotatably mounted in the base portion 38. Each of the base portion 38 and the cap portion 40 includes an opening 42 therein. The cap portion 40 can be selectively rotated to adjust the overlap between the openings 42 to increase or decrease the ease with which pet treats 72 may exit through the ported caps 30. The ported caps 30 can have a flush design like the flush solid caps 28. In at least one possible embodiment, the ported cap design could be incorporated into the projecting structures 34 to also permit dispensing of pet treats 72 through the projecting structures 34. The solid caps 28 and ported caps 30 are interchangeable in the orifices 22, such as by a press-fit connection or a threaded connection, to provide the pet owner with a variety of configurations as desired.

In use, the interactive pet treat dispenser 10 is both a novelty item and a practical device for mental and physical stimulation of the pet 70, such as a dog or cat or other domesticated animal. First, the shape of the interactive pet treat dispenser 10 is configured much like a piñata used for children's birthday parties, and thus can be used at pet birthday parties, although the interactive pet treat dispenser 10 is not broken like a real piñata. The pet or pets can physically manipulate or strike the container 14 and the projecting structures 34 to cause the container 14 to jostle and flip and bounce around to cause pet treats 72, or even pet food or vitamins, inside the container 14 to exit out through the orifices 22 not covered by the solid caps 28, thereby entertaining the pets and mimicking the experience of striking a piñata. Second, the durable design allows the interactive pet treat dispenser 10 to be used as a daily source of mental and physical stimulation for the pet 70, especially if the pet 70 is home alone for extended periods of time. Since the solid caps 28 and ported caps 30 are interchangeable, the pet owner can vary the accessibility to the treats. For example, the pet owner can first select a number of orifices 22 to be fully closed and inserts the solid caps 28 in these orifices 22. Of the solid caps 28, the pet owner can select how many projecting structure solid caps 34 he wants to use versus flush solid caps 32 to vary how the pet 70 interacts with the container 14. Of the ported caps 30, the pet owner can adjust the openings 42 to make it easier or harder for pet treats 72 to exit through the ported caps 30. The pet owner can even leave one or more of the orifices 22 completely open. The pet owner has essentially endless variations with the interchangeable cover structures 18 to provide different interactions for the pet 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An interactive pet treat dispenser comprising:
   a support frame comprising a pair of support legs;
   a container configured to store pet treats therein and comprising a plurality of orifices through which pet treats may exit said container;
   a suspension assembly detachably connecting said container to said support legs in a suspended manner between said support legs to permit a pet to physically engage and manipulate said container to cause pet treats to exit said container through said orifices;
   a plurality of cover structures configured to be selectively removably connected to said container to partially or fully close said orifices to restrict or prevent pet treats from exiting said container; and wherein said cover structures comprise solid caps that completely close said orifices and ported caps that partially close said orifices.

2. The interactive pet treat dispenser of claim 1, wherein a portion of said solid caps comprise an outer surface that is flush with and follows the outer surface of said container when inserted.

3. The interactive pet treat dispenser of claim 2, wherein a portion of said solid caps comprise a projecting structure that projects out from the outer surface of said container when inserted to provide a pet with a structure to physically engage and manipulate.

4. The interactive pet treat dispenser of claim 3, wherein said projecting structure is in the shape of a cone.

5. The interactive pet treat dispenser of claim 1, wherein said ported caps comprise a base portion insertable into said orifices and a cap portion rotatably mounted in said base portion, wherein each of said base portion and said cap portion comprises an opening therein, and wherein said cap portion can be selectively rotated to adjust the overlap between said openings to increase or decrease the ease with which pet treats may exit through said ported cap.

6. The interactive pet treat dispenser of claim 1, wherein said suspension assembly comprises a pair of resiliently stretchable and twistable wires connecting opposite sides of said container to said pair of support legs.

7. The interactive pet treat dispenser of claim 1, wherein said container is sphere-shaped.

8. The interactive pet treat dispenser of claim 1, wherein said orifices comprise at least six orifices oriented facing in at least six different directions on six different sides of said container.

9. The interactive pet treat dispenser of claim 1, further comprising:

said support frame comprising a pair of rounded base structures, each attached to a corresponding one of said pair of support legs and configured to permit temporary tilting of said support frame by a pet, wherein said container is sphere-shaped, wherein said orifices comprise at least six orifices oriented facing in at least six different directions on six different sides of said container, wherein said suspension assembly comprises a pair of resiliently stretchable and twistable wires connecting opposite sides of said container to said pair of support legs, wherein a portion of said solid caps comprise an outer surface that is flush with and follows the outer surface of said container when inserted, wherein a portion of said solid caps comprise a projecting structure that projects out from the outer surface of said container when inserted to provide a pet with a structure to physically engage and manipulate, wherein said projecting structure is in the shape of a cone, wherein said ported caps comprise a base portion insertable into said orifices and a cap portion rotatably mounted in said base portion, wherein each of said base portion and said cap portion comprises an opening therein, and wherein said cap portion can be selectively rotated to adjust the overlap between said openings to increase or decrease the ease with which pet treats may exit through said ported cap.

10. A method of using the interactive pet treat dispenser of claim 9, comprising:

filling said container with pet treats;

selecting a plurality of said cover structures comprising at least one solid cap and at least one ported cap to configure said container for a first kind of pet interaction; and selectively switching at least one of the type and location of at least one of said cover structures to configure said container for a second kind of pet interaction.

11. The method of claim 10, further comprising adjusting at least one ported cap by adjusting the overlap between said openings to increase or decrease the ease with which pet treats may exit through said at least one ported cap.

12. An interactive pet treat dispenser comprising:

a support frame comprising a pair of support legs;

a container configured to store pet treats therein and comprising a plurality of orifices through which pet treats may exit said container;

a suspension assembly detachably connecting said container to said support legs in a suspended manner between said support legs to permit a pet to physically engage and manipulate said container to cause pet treats to exit said container through said orifices;

a plurality of cover structures configured to be selectively removably connected to said container to partially or fully close said orifices to restrict or prevent pet treats from exiting said container; and wherein said support frame comprises a pair of rounded base structures, each attached to a corresponding one of said pair of support legs and configured to permit temporary tilting of said support frame by a pet.

* * * * *